US012593110B2

(12) United States Patent
Kasi

(10) Patent No.: US 12,593,110 B2
(45) Date of Patent: *Mar. 31, 2026

(54) NEWS FEED FOR MEDIA CONTENT SELECTION

(71) Applicant: OpenTV, Inc., San Francisco, CA (US)

(72) Inventor: Chandrika Kasi, San Jose, CA (US)

(73) Assignee: OpenTV, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/786,954

(22) Filed: Jul. 29, 2024

(65) Prior Publication Data

US 2025/0030923 A1     Jan. 23, 2025

Related U.S. Application Data

(63) Continuation of application No. 17/448,645, filed on Sep. 23, 2021, now Pat. No. 12,081,839, which is a
(Continued)

(51) Int. Cl.
H04N 21/488 (2011.01)
H04N 21/2187 (2011.01)
(Continued)

(52) U.S. Cl.
CPC ..... H04N 21/4886 (2013.01); H04N 21/2187 (2013.01); H04N 21/431 (2013.01); H04N 21/4316 (2013.01); H04N 21/4334 (2013.01); H04N 21/435 (2013.01); H04N 21/4532 (2013.01); H04N 21/4622 (2013.01);
(Continued)

(58) Field of Classification Search
None
See application file for complete search history.

(56) References Cited

U.S. PATENT DOCUMENTS 8,060,830 B2     11/2011  Kahn et al.
2004/0107439 A1     6/2004  Hassell et al.
(Continued)

FOREIGN PATENT DOCUMENTS

CN          1457596 A     11/2003
WO          02071749 A1     9/2002

OTHER PUBLICATIONS

Office Action issued on Jan. 28, 2025, in corresponding Brazilian Application No. BR112019018034-6, 8 pages.

*Primary Examiner* — James R Marandi
(74) *Attorney, Agent, or Firm* — Maier & Maier, PLLC

(57) ABSTRACT

Example embodiments provide a media content news feed identifying one or more media content streams that may be received and displayed. In an example embodiment, media content alert information is received at a media content device that describes at least one of a plurality of media content streams receivable at the media content device via a network. The received media content alert information is processed to generate a content news feed including one or more content news items. The content news feed is presented using the display device. A selection of one of the content news items of the feed is received, with the selected content news item identifying a corresponding media content stream of the plurality of streams. Based on the selected content news item, the corresponding media content stream is processed.

20 Claims, 9 Drawing Sheets

Related U.S. Application Data continuation of application No. 16/991,463, filed on Aug. 12, 2020, now Pat. No. 11,159,857, which is a continuation of application No. 15/446,376, filed on Mar. 1, 2017, now Pat. No. 10,779,050.

(51) Int. Cl.

| | | |
|---|---|---|
| *H04N 21/431* | (2011.01) | |
| *H04N 21/433* | (2011.01) | |
| *H04N 21/435* | (2011.01) | |
| *H04N 21/45* | (2011.01) | |
| *H04N 21/462* | (2011.01) | |
| *H04N 21/475* | (2011.01) | |
| *H04N 21/478* | (2011.01) | |
| *H04N 21/482* | (2011.01) | |
| *H04N 21/485* | (2011.01) | |
| *H04N 21/81* | (2011.01) | |
| *H04N 21/84* | (2011.01) | |
| *H04N 21/845* | (2011.01) | |

(52) U.S. Cl.
CPC ....... *H04N 21/4755* (2013.01); *H04N 21/482* (2013.01); *H04N 21/4858* (2013.01); *H04N 21/488* (2013.01); *H04N 21/4882* (2013.01); *H04N 21/8126* (2013.01); *H04N 21/84* (2013.01); *H04N 21/478* (2013.01); *H04N 21/8456* (2013.01)

(56) References Cited

U.S. PATENT DOCUMENTS

| | | | |
|---|---|---|---|
| 2007/0089068 A1 | 4/2007 | Alexander et al. | |
| 2007/0200875 A1 | 8/2007 | Seeger | |
| 2010/0312826 A1 | 12/2010 | Sarosi et al. | |
| 2013/0040610 A1* | 2/2013 | Migicovsky | .... H04M 1/724095 |
| | | | 455/418 |
| 2013/0204862 A1 | 8/2013 | Marchiori | |
| 2014/0189524 A1* | 7/2014 | Murarka | ............... G06Q 50/01 |
| | | | 715/744 |
| 2015/0026728 A1 | 1/2015 | Carter et al. | |
| 2015/0365725 A1 | 12/2015 | Belyaev et al. | |
| 2016/0243404 A1* | 8/2016 | Keller | ................... G16H 20/30 |
| 2016/0350669 A1* | 12/2016 | Jurka | ................. G06F 16/9535 |

* cited by examiner

CONTENT ACCESS DEVICE 102

NETWORK INTERFACE
202

MEDIA CONTENT
PROCESSING MODULE
204

CONTENT ALERT
ACCESS MODULE
206

CONTENT ALERT
PROCESSING MODULE
208

CONTENT
PREFERENCE DATA
STORAGE
210

MEDIA CONTENT
OUTPUT INTERFACE
212

MEDIA CONTENT DATA
STORAGE
214

USER INTERFACE
216

400

402

(DISPLAYED CONTENT OF
CURRENT MEDIA CONTENT ITEM)

CONTENT NEWS

CH 654 – BRONCOS VS CHIEFS TIED 14-14 WITH 5:32 LEFT — 504

CH 742 – "GONE WITH THE WIND" BEGINS AT 8 PM — 506

CH 358 – PRESIDENTIAL PRESS CONFERENCE BEGINS IN 5 MINUTES — 508

CH 667 – SOUTH AMERICAN TSUNAMI – LIVE COVERAGE NOW — 510

CH 248 – AVALANCHE VS SHARKS 3-2 WITH 3:56 LEFT — 512

(DISPLAYED CONTENT OF CURRENT MEDIA CONTENT ITEM)

502

402

500

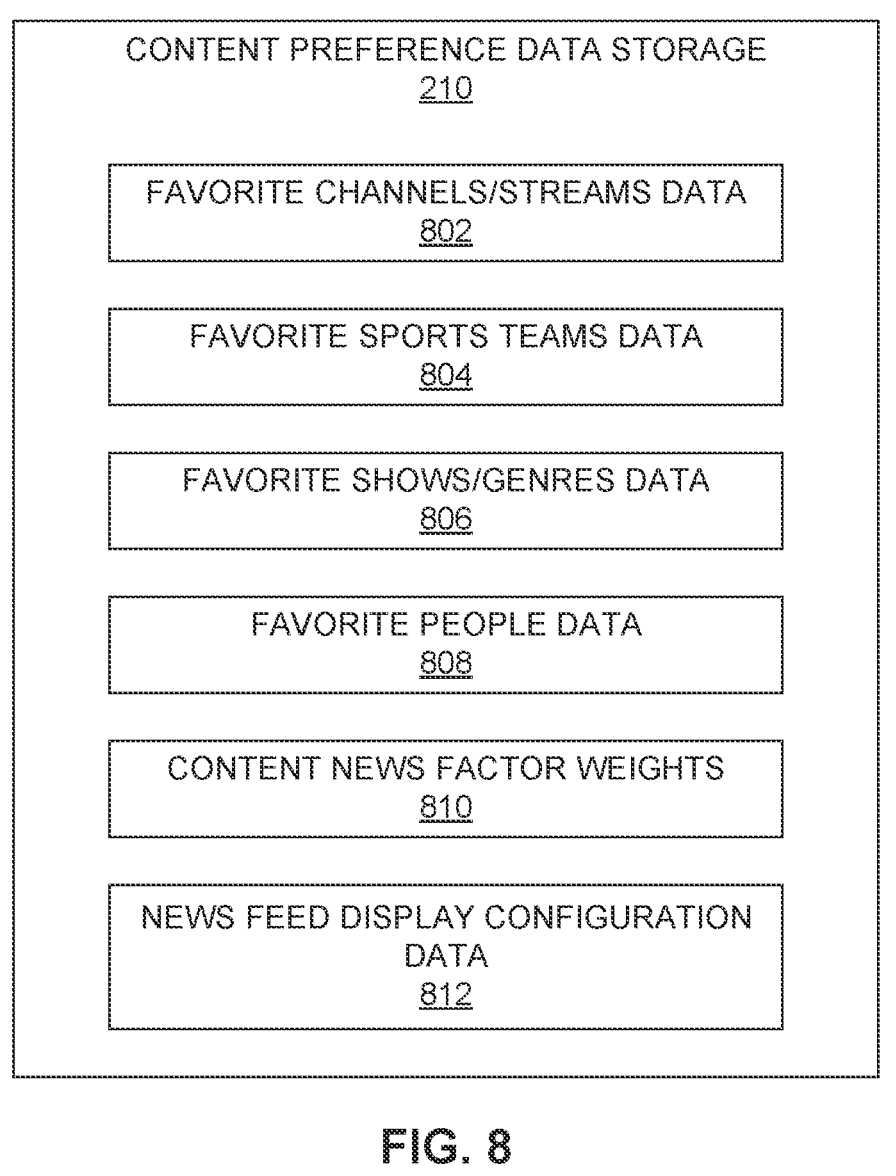

CONTENT PREFERENCE DATA STORAGE
210

FAVORITE CHANNELS/STREAMS DATA
802

FAVORITE SPORTS TEAMS DATA
804

FAVORITE SHOWS/GENRES DATA
806

FAVORITE PEOPLE DATA
808

CONTENT NEWS FACTOR WEIGHTS
810

NEWS FEED DISPLAY CONFIGURATION
DATA
812

FIG. 8

NEWS FEED FOR MEDIA CONTENT SELECTION

PRIORITY APPLICATION

This application is continuation of U.S. patent application Ser. No. 17/448,645, filed Sep. 23, 2021, which is continuation of U.S. patent application Ser. No. 16/991,463, filed Aug. 12, 2020, which is a continuation of U.S. patent application Ser. No. 15/446,376, filed Mar. 1, 2017, the disclosures of which are incorporated herein in their entireties by reference.

FIELD

The present disclosure relates generally to presentation of media content and, in a specific example embodiment, to presentation of a content news feed for media content selection.

BACKGROUND

An ever-increasing number of media content sources continue to become available to users, ranging from several local terrestrial television channels, to hundreds of satellite and cable television channels, to a plethora of online audio and/or video streams (e.g., sourced by Netflix®, YouTube™, and the like). With so many choices available, and with many of these choices being broadcast or streamed "live," a user may experience difficulty keeping apprised of those items of media content in which the user truly has an interest. While electronic program guides (EPGs) and similar sources of media content scheduling information may be available for a user to peruse or search, presuming the media content is scheduled significantly in the future, more emergent circumstances regarding items of media content, such as fast-breaking news stories, changing circumstances in sporting events, and so on, may not be available to the user, thus causing the user to be unaware of a particular media content item that would likely be of interest to the user.

BRIEF DESCRIPTION OF DRAWINGS

Various ones of the appended drawings merely illustrate example embodiments of the present disclosure and cannot be considered as limiting in scope.

FIG. 8 is a block diagram of an example content preference data storage of the content access device of FIG. 2.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
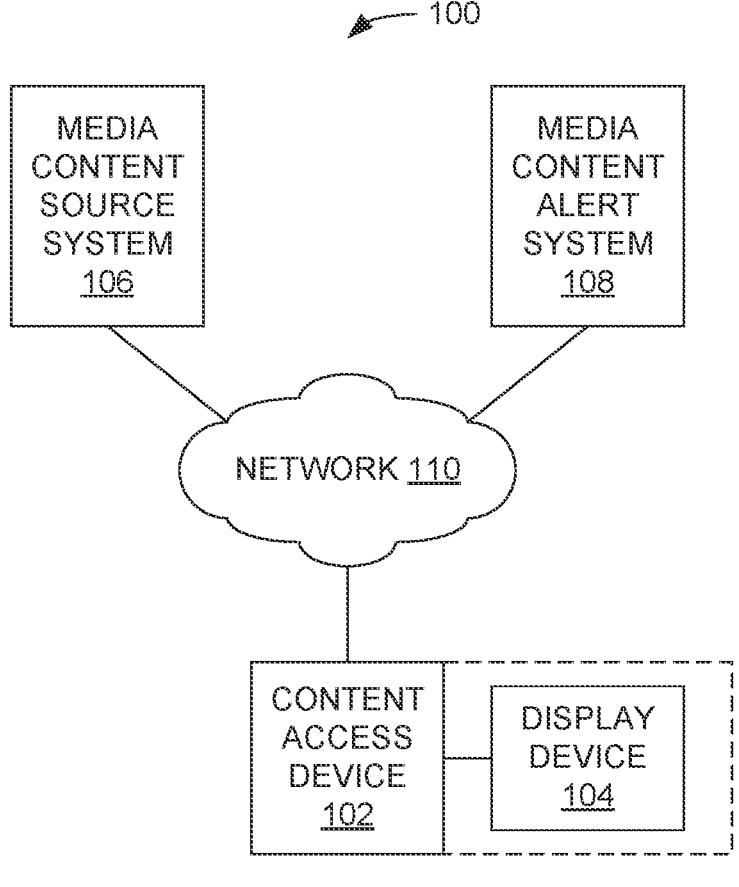
FIG. 1 is a block diagram of an example media content distribution system employing an example media content alert system and an example content access device.

FIG. 1 is a block diagram of an example media content distribution system 100 employing an example media content alert system 108 and an example content access device 102. In the media content distribution system 100, a media content source system 106 and the media content alert system 108 may communicate with the content access device 102 via a communication network 110. Examples of the communication network 110 may include, but are not limited to, a wide-area network (WAN) (e.g., the Internet), a local area network (LAN), a cellular network (e.g., third-generation (3G) or fourth-generation (4G) network), a cable television network, a satellite television network, a terrestrial television network, or any other communication network or connection, or combinations thereof.

The media content source system 106 may be configured to transmit or deliver one or more media content streams (e.g., audio/video content, video content, audio content, and so on, including movies, sporting events, television episodes, songs, and the like) to one or more content access devices 102 via the network 110. Examples of the media content source system 106 may include, but are not limited to, a cable television provider system (e.g., a head-end), a satellite television provider system, a television network media distribution system, an on-demand television system, an online video streaming service system, and the like. While FIG. 1 depicts a single media content source system 106, two or more such media content source systems 106 may be included in other example embodiments of the media content distribution system 100.

The media content alert system 108 may be configured to transmit or deliver media content alert information, such as timely updates regarding one or more media content streams accessible from the media content source system 106. Such information may be received in the form of rich site summary (RSS) news feed items, short message service (SMS) texts, social network posts from a social network platform (e.g., Twitter®, Facebook®, and the like). Examples of the media content alert system 108 may include, but are not limited to, an RSS news feed distribution system, an online news service system, and an online social networking service. While FIG. 1 illustrates a single media content alert system 108, multiple media content alert systems 108 may be included in some example embodiments of the media content distribution system 100. In some examples, at least one media content alert system 108 may be incorporated within one or more media content source systems 106.

The content access device 102 may be configured to receive the one or more media content streams from one or more media content source systems 106, and to receive media content alert information (e.g., RSS items, social media posts, and so on) from one or more media content alert systems 108 via the network 110. The content access device 102 may also be configured to cause presentation of one or more of the media content streams, such as via a display device 104 communicatively coupled to the content access device 102. In some example embodiments, the display device 104 may be connected to the content access device 102 in a wired or wireless manner. In other example embodiments, the display device 104 may be incorporated in the content access device 102. Examples of the content access device 102 may include, but are not limited to, a cable or satellite television set-top box (STB), a desktop computer, a tablet computer, a smart phone, a smart television, a content streaming device (e.g., a Roku® device), and a gaming device. Examples of the display device 104 include, but are not limited to, a television, a video monitor, a touchscreen, audio speakers, and the like. While FIG. 1 depicts a single content access device 102 and associated display device 104, other example embodiments may include multiple content access devices 102 and display devices 104 coupled via the network 110 to the media content source system 106 and the media content alert system 108.

In at least some example embodiments described in greater detail below, the content access device 102 may generate a media content news feed from media content alert information received from the media content alert system 108 via the network 110, and cause the presentation of the media content news feed via the display device 104. The presentation of the media content news feed may be performed in conjunction with the presentation of media content, such as one of the media content streams provided by the media content source system 106 via the network 110. The media content news feed may include information regarding the media content streams available from the media content source system 106. The content access device 102 may then receive a selection of an item of the content news feed and, in response to the selection of the item, process (e.g., cause the presentation or recording of) a media content stream corresponding to the selected content news item. Consequently, a user or viewer of the content access device 102 may be kept apprised of one or more media content streams or items of potential interest to the user on a real-time basis while the user is viewing other content, and without requiring the user to proactively search for such content, such as by way of perusing or searching an EPG.

Figure 2:
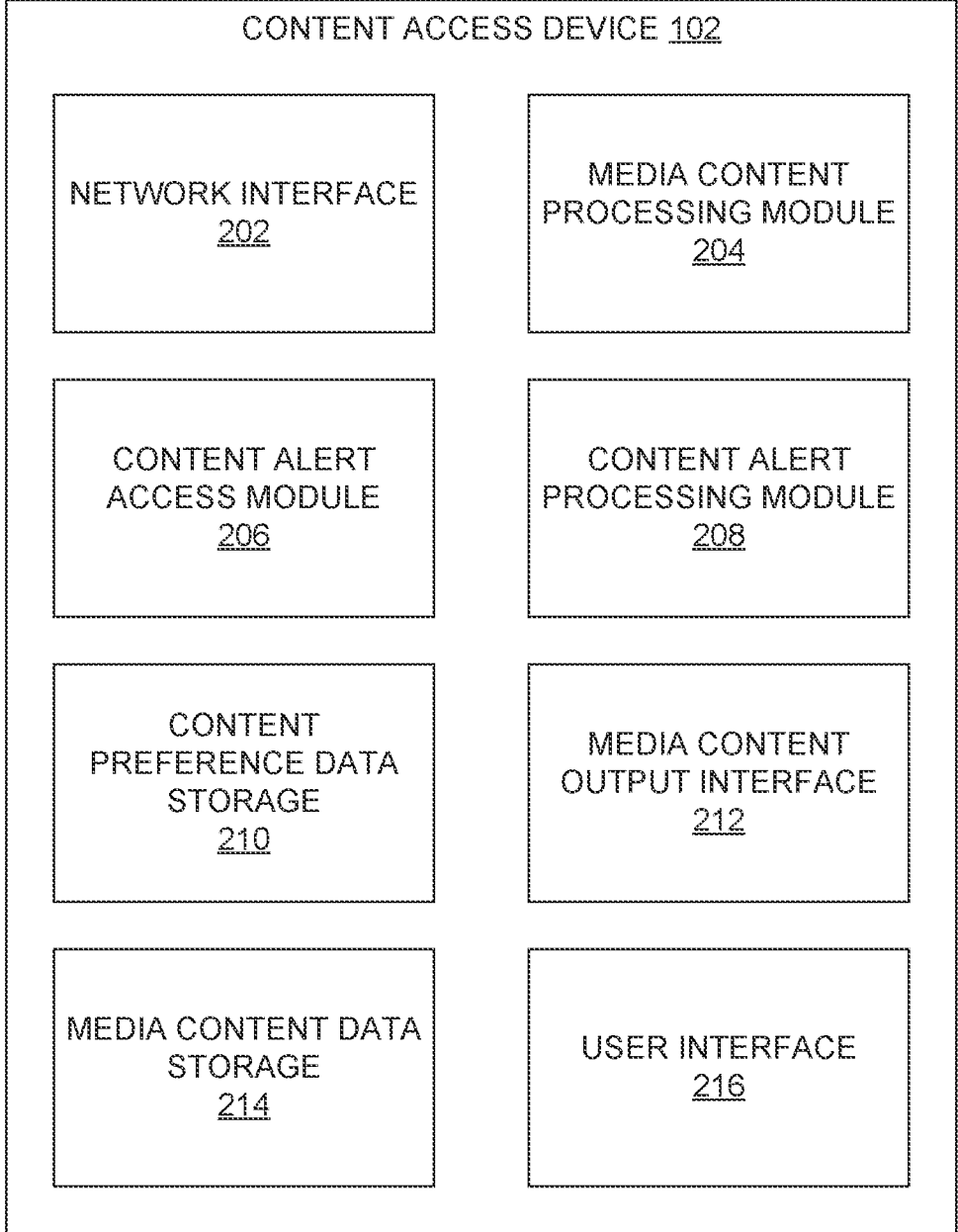
FIG. 2 is a block diagram of an example content access device employable in the example media content distribution system of FIG. 1.

FIG. 2 is a block diagram of an example of the content access device 102 employable in the media content distribution system 100 of FIG. 1. As illustrated in FIG. 2, an example embodiment of the content access device 102 includes a network interface 202, a media content processing module 204, a content alert access module 206, a content alert processing module 208, a content preference data storage 210, a media content output interface 212, a media content data storage 214, and a user interface 216. In example embodiments, the various modules 202-216 of the content access device 102 may be implemented in hardware (e.g., logic circuits and other electronic components), in software or firmware in the form of instructions stored in a memory and configured to be executed on one or more hardware processors (e.g., microprocessors, microcontrollers, and the like), or some combination thereof. Also in some example embodiments, fewer than all of the modules 202-216 may be implemented, and additional modules other than those explicitly depicted in FIG. 2 may be employed.

The network interface 202 may be configured to access and receive the media content streams from the media content source system 106 and the media content alert information from the media content alert system 108. In an example embodiment, the network interface 202 may include one or more of a WAN (e.g., Internet) interface, an Ethernet local area network (LAN) interface, a wireless LAN (e.g., WiFi®, Bluetooth®, and so on) interface, a wireless cellular (e.g., Long-Term Evolution (LTE®)) interface, a cable television interface, a satellite television receiver, a terrestrial television receiver, and so on.

The media content processing module 204 may be configured to process (e.g., convert, decrypt, decode, and so on) the media content streams received via the network interface 202 for outputting to the display device 104 (e.g., via the media content output interface 212), for recording and storage (e.g., at the media content data storage 214 residing within the content access device 102, or via the media content output interface 212 to an external data storage device, such as a magnetic disk drive, flash memory, or the like), or for other purposes.

The content alert access module 206 may be configured to receive media content alert information via the network interface 202. In an example embodiment, the media content alert information includes information describing one or more aspects of one or more of the media content streams that may be received via the network interface 202. For example, the media content alert information may identify a particular media content stream (e.g., by channel number, label, Uniform Resource Locator (URL), or other means) and describe some aspect or characteristic of the particular content or subject matter of the identified stream, for one or more of the media content streams that may be received via the network interface 202.

In an example embodiment, the aspect of the content stream being described may be a starting time of a particular upcoming program or segment of the stream, such as a sporting event (e.g., football or baseball game), a movie, a news program, a television episode, a music concert, and so on. In another example, the aspect being described may be an update to a particular program or segment that is already in progress, such as the current score, amount of time remaining, and other information regarding a sporting event, or an indication that some newsworthy event has recently occurred that is being reported. Other examples of media content alert information are also possible.

In some example embodiments, at least some of the media content alert information may be organized into multiple items, with each item including an identity of a particular media content stream and a description of one or more aspects of that media content stream. Additionally, the content alert access module 206 may receive the media content alert information from multiple media content alert systems 108 or sources of one or more different types. In an example embodiment, an RSS feed system may serve as a media content alert system 108, with each item of the RSS feed being an alert describing an upcoming or current program or segment of a particular media content stream. In addition, an RSS feed may be associated specifically with a source of one or more specific media content streams, such as a major television network (e.g., ABC, CBS, NBC, ESPN, and so on). In another example embodiment, a social media network or online chat service (e.g., Twitter®, Facebook®, and the like) may serve as a media content alert system 108, with one or more of the posts, "tweets," or other items or entries provided by one or more members of the social media network including the media content alert information for one or more media content streams. Other potential sources of media content alert information may include Short Message Service (SMS) texts, emails, and other forms of textual or graphical information.

In example embodiments, the content alert access module 206 may be configured to access certain media content alert systems 108 or sources. The identity of those particular sources may be specified in the content preference data storage 210. For example, a user may employ the user interface 216 to specify directly the sources from which the media content alert information is to be received. In another example embodiment, the user may employ the user interface 216 to specify those sources indirectly, such as by indicating which media content streams (e.g., by channel number, television network, online content source, and so on) are of interest to the user, and the content alert access module 206 may determine the media content alert systems 108 from which the media content alert information is to be received based on the selected media content streams. In some example embodiments, by allowing the user to specify the particular sources of media content alert information to use, or by providing the user with a predetermined set of such sources from which the user may select, the probability of receiving alert information from a malicious source may be reduced.

To receive the media content alert information from one or more media content alert systems 108, the content alert access module 206 may employ any method of receiving the media content alert information compatible with the source of that information. For example, to receive an RSS feed containing media content alert information, the content alert access module 206 may subscribe to that particular RSS feed. In another example, to receive texts or emails containing media content alert information, the content alert access module 206 may subscribe to the selected source providing the texts or emails by way of a mobile number or email address associated with the content access device 102. More generally, the content alert access module 206 may either receive the media content alert information by way of a push model, by which a media content alert system 108 transmits each item of media content alert information as it becomes available, or may periodically poll a media content alert system 108 to retrieve whatever new media content alert information is currently available.

In response to the content alert access module 206 receiving media content alert information, the content alert processing module 208 may be configured to process that information to generate items of a media content "news feed" or information stream for presentation via the display device 104 communicatively coupled to the content access device 102. In some example embodiments, the content alert processing module 208 may filter the received media content alert information to remove or ignore one or more items of the alert information before presentation. Further, the removing or ignoring of alert information items may be based on information stored in the content preference data storage 210, as described above. For example, the content preference data storage 210 may include data indicating the favorite sports or sports teams of the user of the content access device 102. Consequently, the content alert processing module 208 may ignore or deprioritize sports-related alert information items that do not involve the favorite sports or sports teams denoted in the content preference data storage 210. In another sports-related example embodiment, the content preference data module 210 may include data regarding particular circumstances in which alert information regarding a particular sporting event should be presented, such as the score differential between two teams of a sporting event, the time remaining in the sporting event, and so on. The content alert processing module 208 may then determine whether a sports-related alert information item may be ignored or presented via the display device 104 based on the data stored in the content preference data storage 210.

In other example embodiments, the content alert processing module 208 may be configured to filter the received media content alert information according to favorite or preferred media content streams, subject matter, people, and so on. In various examples, a user's favorite media content streams (e.g., favorite broadcast channels, online content sources, and so on), favorite subject matter (e.g., favorite movie genres, musical genres, sports, television programs, and the like), favorite people (e.g., favorites actors, directors, singers, musical bands, historical figures, sports figures, news commentators, and the like), and other data indicating favorite topics or subject matters of a user may be indicated in data stored in the content preference data storage 210 for use by the content alert processing module 208 to filter the received media content alert information. As indicated above, such information may be specified by a user of the content access device 102 via the user interface 216.

In an example embodiment, the content alert processing module 208 may be configured to process the received media content alert information by parsing one or more items of the received alert information to identify the particular media content stream and description associated with that stream in the text of the item. In yet other example embodiments, the content alert processing module 208 may be configured to employ the parsed alert information items to generate related items of the content news feed to be presented via the display device 104, possibly in a standardized or common presentation format. For example, each content news feed item may begin with an identification of the particular media content stream (e.g., broadcast channel number, broadcast network name, etc.), followed by a description of the particular content item or segment being streamed, along with possibly some description as to its relative importance or interest to a user or viewer.

As discussed more fully above, the content preference data storage 210 may be configured to store preference data related to the reception and processing of the media content alert information. In some example embodiments, the content preference data storage 210 may store configuration data related to the presentation of the media content news feed generated from the received and processed media content alert information. For example, the content preference data storage 210 may include information specifying a location on the display device 104 at which the media content news feed is to be presented, such as along the left or right side of the display surface, or along a bottom of the display area as an information "crawl," in which text of the items of the media content news feed proceed from right to left. The content preference data storage 210 may also include configuration data regarding a font, color, and/or other characteristic of the text of the media content news feed items. Further, the content preference data storage may include data indicating a total number of content news feed items to display on the display device 104 at any time, a relative priority of the various types of content news feed items that determine the order in which the content news feed items are presented on the display device 104, configuration data that indicates if and when the content news feed items are to be presented on the display device 104, and so on.

The media content output interface 212 may be configured to cause presentation of one or more received media content items, possibly along with one or more media content news feed items, via the display device 104. In example embodiments in which the display device 104 is located externally to the content access device 102, the media content output interface 212 may be a High-Definition Multimedia Interface (HDMI), a composite video interface, a component video interface, a radio frequency (RF) coaxial cable interface, or the like. In example embodiments in which the display device 104 is located within the content access device 102, a more proprietary interface compatible with the display device 104 may be implemented.

The media content data storage 214 may be configured to store one or more recorded portions of one or more media content streams received via the network interface 202 and processed by the media content processing module 204, thus facilitating the use of the content access device 102 as a digital video recorder (DVR) or digital audio recorder. As illustrated in the example embodiment of FIG. 2, the media content data storage 214 is located within the content access device 102. In other example embodiments, the media content data storage 214 may be located externally to the content access device 102, communicatively coupled therewith by way of a wired or wireless communication interface.

The user interface 216 may be configured to receive commands for the content access device 102 from a user, such as for specifying configuration data stored in the content preference data storage 210, selecting one or more media content streams for presentation or recording, selecting one or more media content news feed items for media content stream selection or recording, and other functions performed in the content access device 102. The user interface 216 may include an interface for communicating with a keyboard, mouse, remote control, or other user input device that a user may employ to input commands to the content access device 102.

Figure 3:
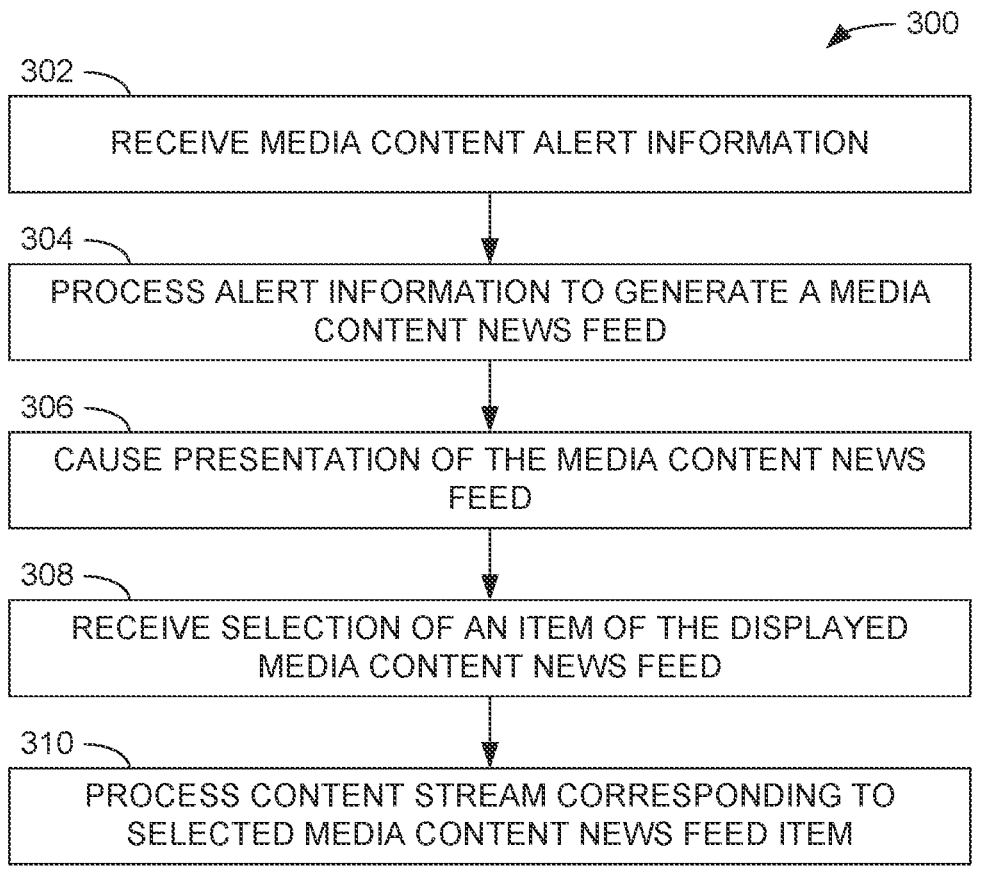
FIG. 3 is a flow diagram of an example method of employing media content alert information to facilitate user selection of media content.

FIG. 3 is a flow diagram of an example method 300 of employing media content alert information to facilitate user selection of media content. While the operations of the method 300 are described hereinafter in relation to the various modules 202-216 of the content access device 102, other devices or modules not described may perform the operations in other example embodiments. Also, while the operations of the method 300 of FIG. 3 are presented in a particular order, other orders of execution are also possible, including simultaneous, concurrent, or overlapping execution of two or more operations.

In the method 300, the content alert access module 206 may receive media content alert information from one or more media content alert systems 108 (operation 302) via the network interface 202, as described above. In an example embodiment, the content alert access module 206 may employ configuration data stored in the content preference data storage 210 to identify the particular media content alert systems 108 to access. While the media content alert information is being received, the media content processing module 204 may be receiving and processing one or more media content streams from one or more media content source systems 106 via the network interface 202, such as streams selected by the user via the user interface 216. The media content processing module 204 may also provide the processed streams to either or both of the media content output interface 212 for presentation via the display device 104 or the media content data storage 214 for recording for later presentation.

The content alert processing module 208 may process the received media content alert information to generate a media content news feed (operation 304) for presentation via the display device 104 (operation 306). In an example embodiment, the processing of the received media content alert information may include filtering, parsing, formatting, and other processing operations, possibly based on configuration data residing in the content preference data storage 210, as discussed above.

During the presentation of the media content news feed, the content access device 102 may receive a user input via the user interface 216 indicating a selection of an item of the media content news feed (operation 308). The selection may cause the media content processing module 204 to process (e.g., cause presentation or recording) of the media content stream identified by the selected content news feed item (operation 310). In an example embodiment, the user interface 216 may receive a related selection indicating whether the media content stream (e.g., a particular program or segment of the media content stream) is to be presented live or recorded for subsequent viewing.

Figure 4:
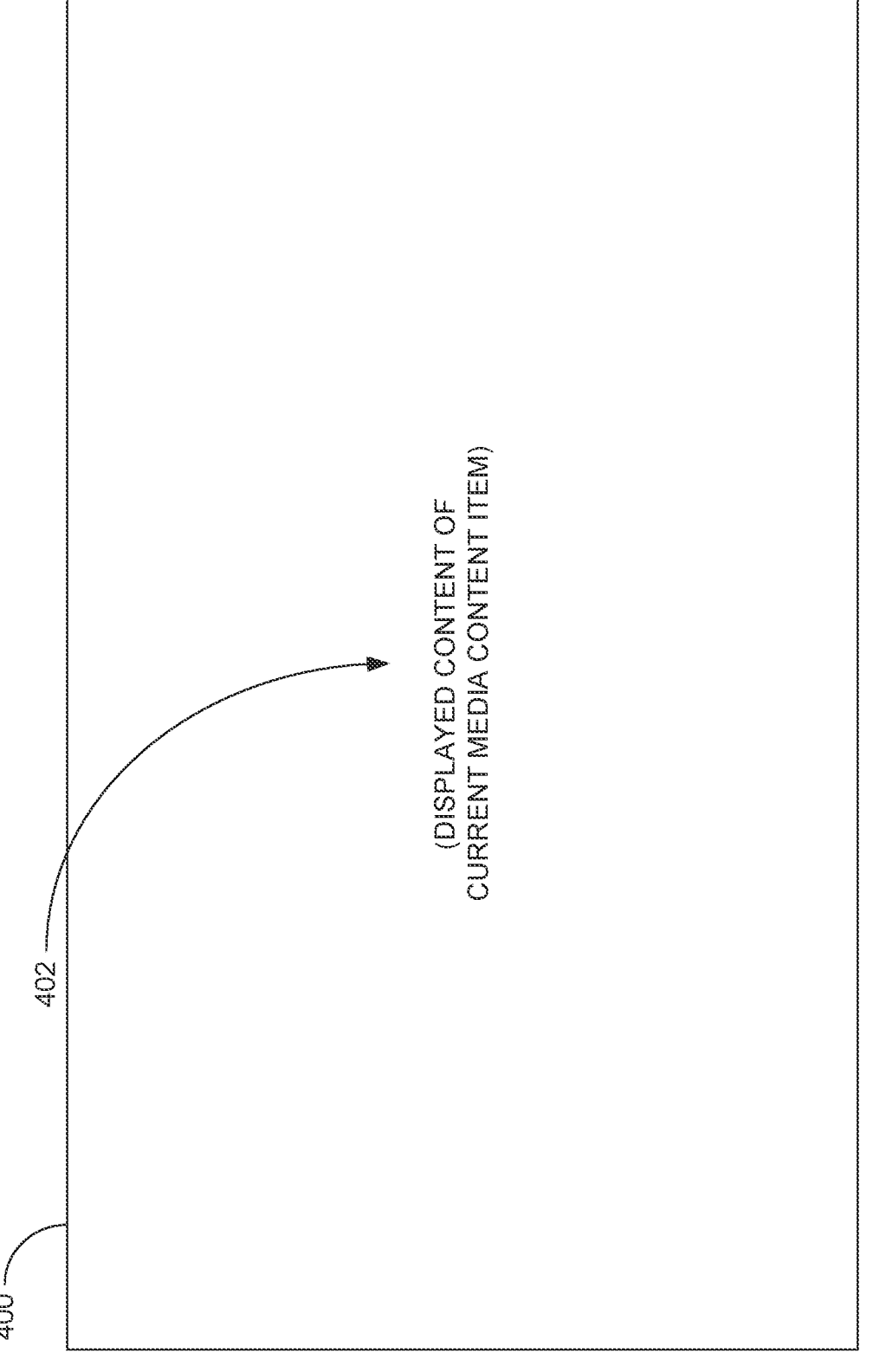
FIG. 4 is a graphical representation of a presentation of a current media content item.

FIGS. 4 through 7 are graphical representations of a content display of the display device 104 at various phases of an example embodiment of receiving and employing media content alert information. For example, FIG. 4 is a graphical representation of a presentation 400 of a current media content item 402 (e.g., a previously recorded program stored in the media content data storage 214, or a media content stream currently being received via the network interface 202) on the display device 104. At this particular point in time, in an example embodiment, there may be no media content alert information to receive, process, and present as a media content news feed via the display device 104. In another example embodiment, presentation of a media content news feed may be disabled, such as by way of configuration data stored in the content preference data storage 210, or a current selection received from the user via the user interface 216.

Figure 5:
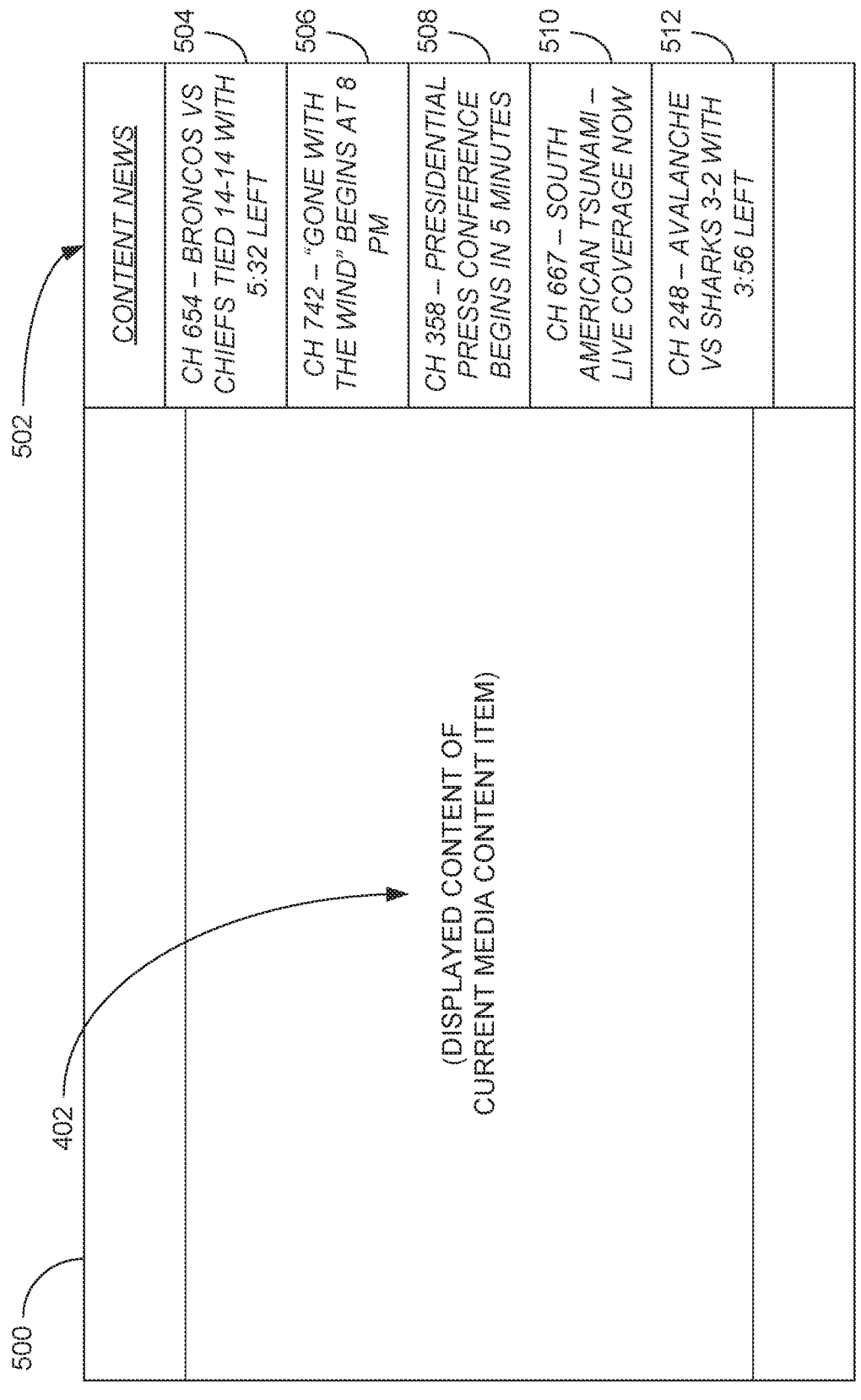
FIG. 5 is a graphical representation of a presentation of a current media content item with a displayed media content news feed.

FIG. 5 is a graphical representation of a presentation 500 of the current media content item 402 with a displayed media content news feed 502. In this example embodiment, the media content news feed 502 is presented along a right-hand edge of the display area of the display device 104, although other locations may be selected for the media content news feed 502, such as by way of configuration data stored in the content preference data storage 210. Further, in the particular example embodiment of FIG. 5, the visible size of the current media content item 402 is reduced while retaining the form factor of the current media content item 402. In other example embodiments, the media content news feed 502 may be laid atop a portion of the displayed current media content item 402, thus possibly obscuring a portion of the current media content item 402 while allowing the current media content item 402 to occupy a greater overall portion of the viewable area of the display device 104.

As depicted in FIG. 5, the media content news feed 502 includes several separate news feed items 504, 506, 508, 510, 512. Each of the content news feed items 504 through 512 indicates a particular media content stream (e.g., Channel 654 ("CH 654")), along with a description of the particular content or program that is currently being presented, or that will be presented in the near future. For example, the description of the first news feed item 504 indicates that the Broncos-Chiefs game being shown on Channel 564 is tied 14-14 with five minutes and 32 second left in the game. News feed item 506 indicates that the movie "Gone with the Wind" begins at 8 PM on Channel 742, while news feed item 508 indicates that a presidential press conference begins in five minutes on Channel 358. Furthermore, news feed item 510 indicates that live news coverage of a tsunami affecting South America is being presented on Channel 667. Finally, news item 512 indicates that the score in the Avalanche-Sharks hockey game being presented on Channel 248 is 3-2 with three minutes and 56 seconds remaining in the game. In other examples, identifiers for one or more of the news feed items 504-512 may be something other than channel numbers, such as station call letters, network names, URLs, website names, and so on.

In an example embodiment, each of the content news feed items 504-512 may be selected from a greater number of possible content news feed items represented from the media content alert information received via the network interface 202. In another example embodiment, a greater number of content news feed items may be available in the media content news feed 502 for presentation, with the various items being cycled for presentation, such as by way of a "scrolling" or "crawling" action on the display device 104. In other example embodiments, the number of items 504-512 of the media content news feed 502 may be limited to some number (e.g., one or two) to reduce the level of distraction that presenting a greater number of content news feed items may generate.

The displayed content news items 504-512 of the media content news feed 502 may be selected based on sport team preferences, movie genre preferences, television program preferences, actor preferences, media content stream preferences, and so on. In addition, the order in which the items 504-512 of the media content news feed 502 may be presented on the display device 104 may be determined by a relative weight or priority assigned to each of the items 504-512 indicated by configuration data stored in the content preference data storage 210. For example, the configuration data may prioritize football games over movies, news events, and hockey games.

Figure 6:
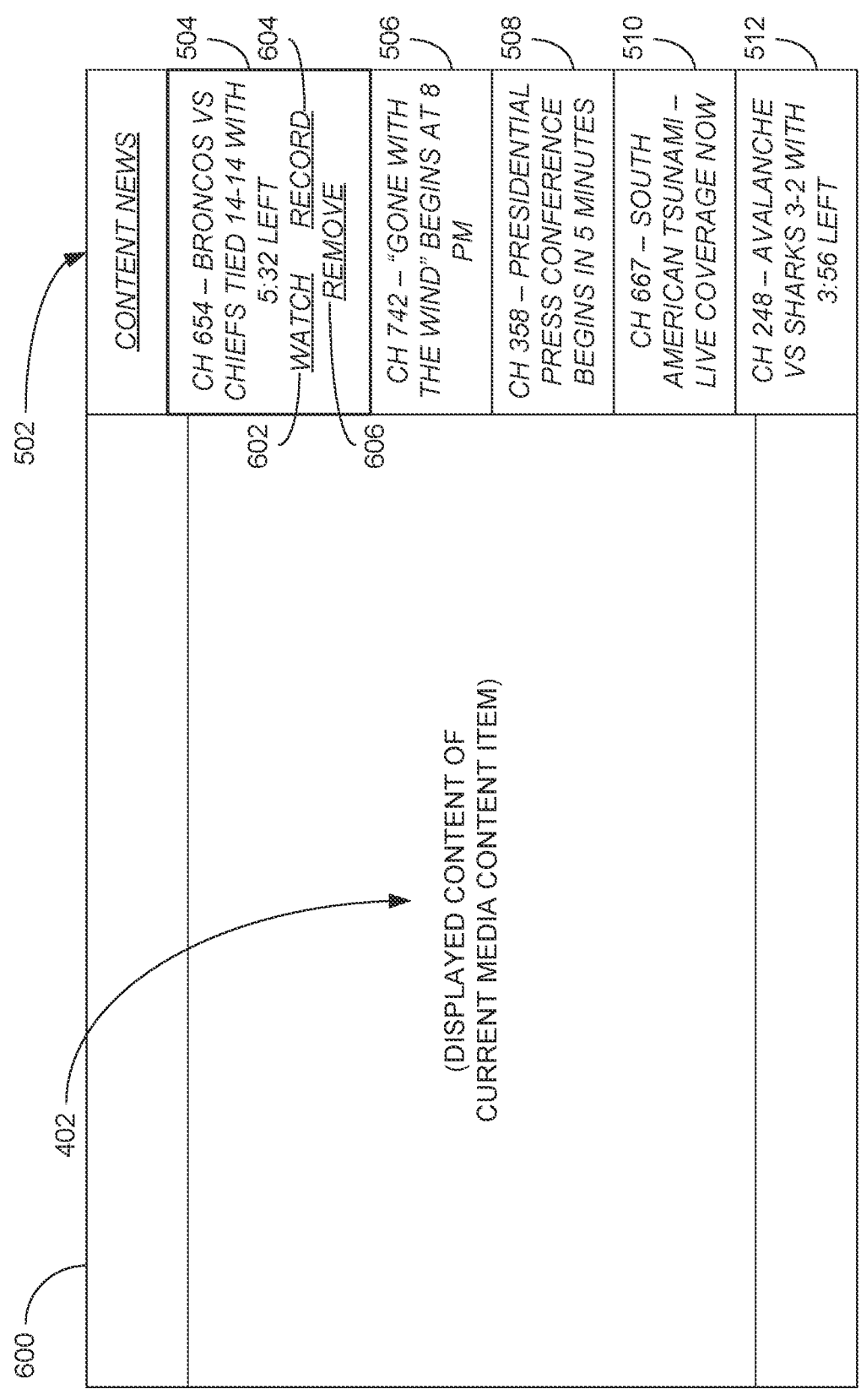
FIG. 6 is a graphical representation of a presentation of a current media content item with a displayed media content news feed, and with a content news item of the media content news feed selected.

FIG. 6 is a graphical representation of a presentation 600 of the current media content item 402 with a displayed media content news feed 502, and with a content news feed item 504 selected by the user from the media content news feed 502. In an example embodiment, the user of the content access device 102 may employ the user interface 216 (e.g., via a keyboard, remote control, or other user interface device) to select the item 504. In an example embodiment, the selection of the item 504 may result in the presentation of the media content stream (e.g., Channel 654) on the display device 104, either by itself or in conjunction with the currently displayed media content item 402.

In the particular example of FIG. 6, selection of the content news feed item 504 results in the presentation of the item 504 being modified to present a plurality of options 602, 603, 604. More specifically, the options include a first option 602 ("Watch") causing the corresponding media content stream to be presented immediately via the display device 104, a second option 604 ("Record") causing the corresponding media content stream to be recorded for subsequent viewing, and a third option 606 ("Remove") causing the selected content news feed item 504 to be removed from the media content news feed 502. Other options regarding a selected news feed item may be presented and implemented in other example embodiments. For example, an option may be provided to delay action on the item 504, which may result in the item 504 being temporarily removed from the news feed 502 for some period of time, after which an updated version of the same item 504 may be presented in the news feed 502 once again. Moreover, the initial selection of the news feed item 504 may result in the presentation and/or recording of the corresponding media content stream based on configuration data stored in the content preference data storage 210, thus potentially resulting in the options 602, 604, 606 depicted in FIG. 6 not being presented via the display device 104.

Figure 7:
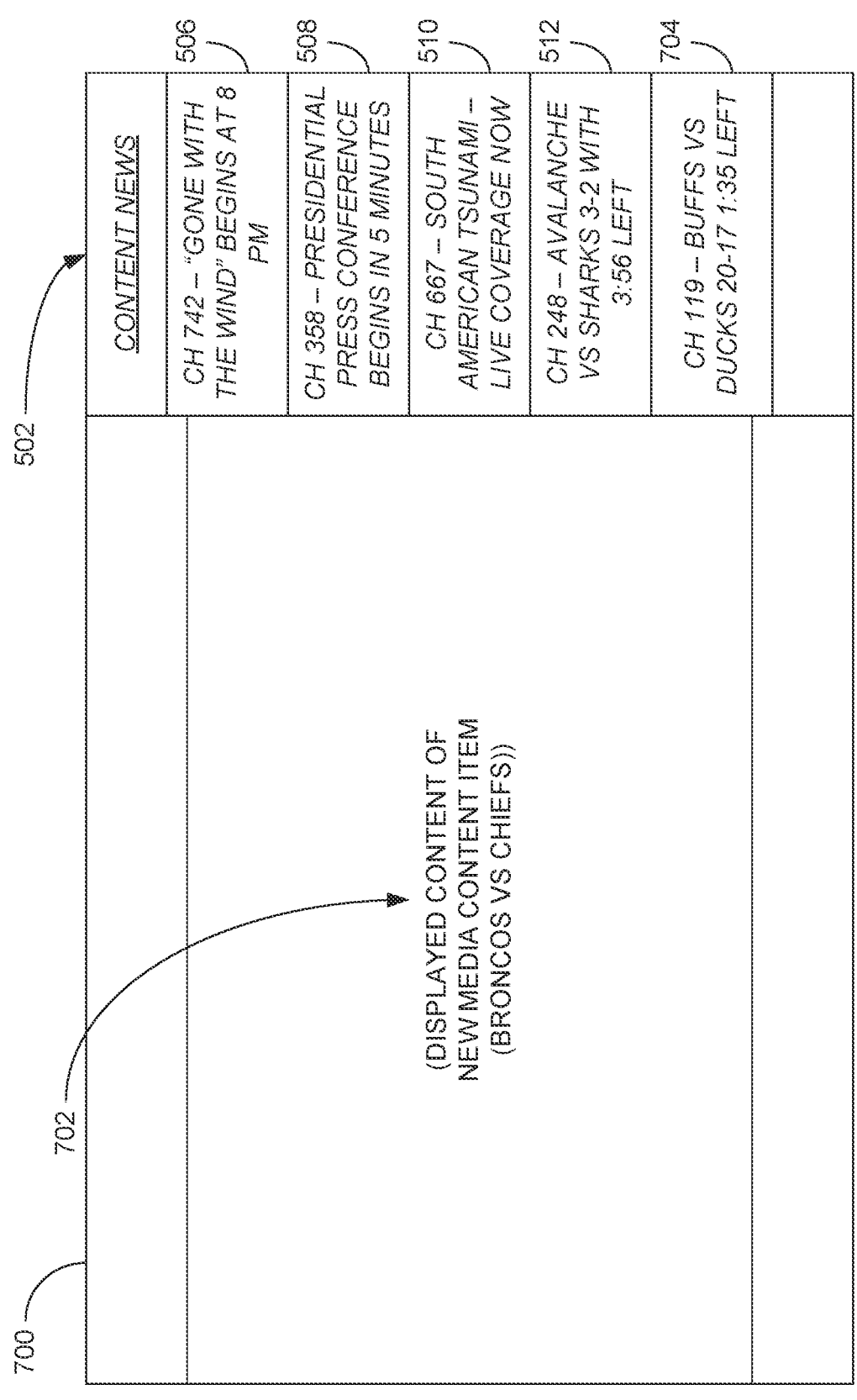
FIG. 7 is a graphical representation of a presentation of a new media content item selected by a user, along with the media content news feed.

FIG. 7 is a graphical representation of a presentation 700 of the new media content stream associated with the content news feed item 504 selected by the user (depicted in FIG. 6), along with the media content news feed 502. In this example embodiment, the selected media content stream 702 (Channel 654, presenting the Broncos-Chiefs game) is presented in replacement of the media content item 402 that was previously being presented via the display device 104, such as in response to the selection of the "Watch" option 602 illustrated in FIG. 6. In another example embodiment, the selected media content stream 702 may be presented in conjunction with the current media content item 402, such as in a picture-in-picture (PIP) configuration.

Moreover, in response to the selection of one of the options 602, 604, 606 of the selected content news feed item 504, the selected content news feed item 504 may be removed from the media content news feed 502, as depicted in FIG. 7. Additionally, a new content news feed item 704 (e.g., an item indicating that the Buffs-Ducks football is being shown on Channel 119, with the Buffs leading the game 20-17 with one minute and 35 seconds remaining in the game) may be added to the media content news feed 502.

In the particular example embodiment of FIGS. 6 and 7, the program indicated in content news feed item 504 (e.g., the Broncos-Chiefs game) was immediately accessible via the corresponding media content stream (e.g., Channel 654), resulting in the presentation of the corresponding media content stream immediately in response to the selection of the Watch option 602. In another example embodiment in which the content news feed item 506 associated with the movie "Gone with the Wind" is selected, the program item of interest is not available for viewing or recording until 8 PM. Consequently, selection of the content news feed item 506 to view or record the movie may result in the content access device 102 presenting or recording the movie beginning at the appropriate time (8 PM).

FIG. 8 is a block diagram of an example embodiment of the content preference data storage 210 of the content access device 102 of FIG. 2. In this example embodiment, the content preference data storage 210 may store configuration data that includes favorite channels/streams data 802, favorite sports teams data 804, favorite shows/genres data 806, favorite people data 808, content news factor weights 810, and news feed display configuration data 812. In other example embodiments, greater or fewer types of configuration data other than those types illustrated in FIG. 8 may be employed by the content alert access module 206 and the content alert processing module 208 in receiving and processing the media content alert information from the one or more media content alert systems 108 of FIG. 1. In some example embodiments, the content access device 102 may employ the user interface 216 to receive user input to define the configuration data stored in the content preference data storage 210. Thereafter, the content alert access module 206 may identify and receive media content alert information from one or more media content alert systems 106, and the content alert processing module 208 may process (e.g., filter) the received media content alert information, based on the configuration data stored in the content preference data storage 210.

More specifically, the favorite channels/streams data 802 may indicate the various broadcast channels, online media content streams, and other media content streams that the content access device 102 may receive via the network interface 202 that the user of the content access device 102 prefers. In an example embodiment, the favorite channels/ streams data 802 may also include identity information of preferred media content source systems 106 and preferred media content alert systems 108 from which media content streams and associated media content alert information are to be received. The favorite sports teams data 804 may indicate teams and/or sports of particular preference by the user. The favorite shows/genres data 806 may indicate the user's preference for particular television shows or pro- grams, movie genres, music genres, and so on. The favorite people data 808 may indicate particular preferences of the user for specific people (e.g., actors, directors, writers, composers, musicians, athletes, celebrities, and others) that may be involved in a media content item. Other types of user preferences may be specified in the content preference data storage 210 in other example embodiments.

In an example embodiment, the content alert processing module 208 may employ multiple ones of the preferences indicated in the preference data 802-808 as factors to be combined in determining which items of the received media content alert information are to be presented as content news feed items 504-512 of the media content news feed 502. In combining the preferences, the content preference data stor- age 210 may store content news factor weights 810 or priorities that may be used to weight the multiple prefer- ences of the preference data 802-808 so that the preference data 802-808 may be combined (e.g., added) to generate a score for each of multiple possible content news feed items of the media content news feed 502. The possible content news feed items with the highest scores may then be presented as displayed content news feed items 504-512 of the media content news feed 502. Other example embodi- ments employing content news factors weights 810 are also possible.

Also stored in the content preference data storage 210 in an example embodiment, the news feed display configura- tion data 812 may indicate user preferences regarding a plurality of options determining multiple aspects of the presentation of the news feed items 504-512 of the media content news feed 502 via the display device 104. Such aspects may include, but are not limited to, a screen location at which the content news feed 502 is displayed, a data format (e.g., color, font, level of detail of the information imparted) to which the content news feed items 504-512 adhere, a maximum or minimum number of data items 504-512 that may be presented in the content news feed 502 at any one time, whether the content news feed 502 is presented over a currently displayed media content stream 402, whether the display area consumed by the current displayed media content stream 402 is reduced, and the like.

Figure 9:
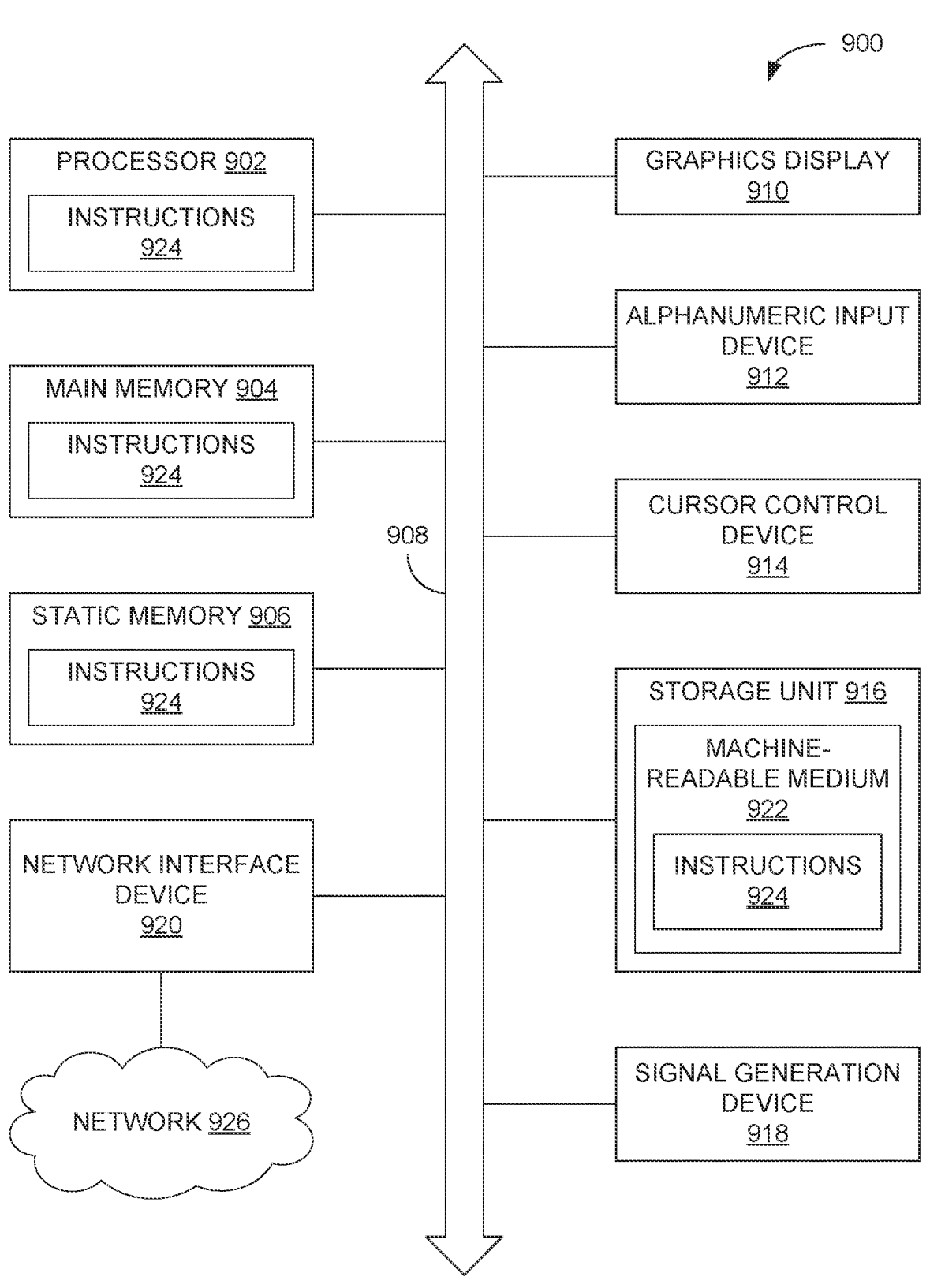
FIG. 9 is a simplified block diagram of a machine in an example form of a computing system within which a set of instructions for causing the machine to perform any one or more of the methodologies discussed herein may be executed.

FIG. 9 is a block diagram illustrating components of a machine 900, according to some example embodiments, able to read instructions 924 from a machine-readable medium 922 (e.g., a non-transitory machine-readable medium, a machine-readable storage medium, or a com- puter-readable storage medium) and perform any one or more of the methodologies discussed herein, in whole or in part. Specifically, FIG. 9 depicts the machine 900 in the example form of a computer device (e.g., a computer) within which the instructions 924 (e.g., software, firmware, a program, an application, an applet, an app, or other execut- able code) for causing the machine 900 to perform any one or more of the methodologies discussed herein, in whole or in part.

For example, the instructions 924 may cause the machine 900 to execute the flow diagram of FIG. 3, as well as all example embodiments associated therewith. The instruc- tions 924 can transform the general, non-programmed machine 900 into a particular machine (e.g., specially con- figured machine) programmed to carry out the described and illustrated functions in the manner described. Also, in example embodiments, the machine 900 may operate as one or more of the modules 202-212 of the content access device 102 of FIG. 2, or any other computing system or device described herein.

In example embodiments, the machine 900 operates as a standalone device or may be connected (e.g., networked) to other machines. The machine 900 may be a server computer, a client computer, a personal computer (PC), a tablet com- puter, a laptop computer, a netbook, a set-top box (STB), a personal digital assistant (PDA), a cellular telephone, a smartphone, a web appliance, a network router, a network switch, a network bridge, a power adapter, or any machine 900 capable of executing the instructions 924, sequentially or otherwise, that specify actions to be taken by that machine 900. Further, while only a single machine 900 is illustrated, the term "machine" shall also be taken to include a collec- tion of machines that individually or jointly execute the instructions 924 to perform any one or more of the meth- odologies discussed herein.

The machine 900 includes a processor 902 (e.g., a central processing unit (CPU), a graphics processing unit (GPU), a digital signal processor (DSP), an application-specific inte- grated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, tem- porarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light-emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, a signal generation device 918 (e.g., a sound card, an amplifier, a speaker, a headphone jack, or any suitable combination thereof), and a network interface device 920.

The storage unit 916 includes the machine-readable medium 922 (e.g., a tangible machine-readable storage medium) on which is stored the instructions 924 embodying any one or more of the methodologies or functions described herein. The instructions 924 may also reside, completely or at least partially, within the main memory 904, within the processor 902 (e.g., within a cache memory of the processor 902), or both, before or during execution thereof by the machine 900. Accordingly, the main memory 904 and the processor 902 may be considered machine-readable media 922 (e.g., tangible and non-transitory machine-readable media).

In some example embodiments, the machine 900 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 922 able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions 924. The term "machine-readable medium" shall also be taken to include any medium, or combination of multiple media, that is capable of storing instructions 924 for execution by a machine (e.g., machine 900), such that the instructions 924, when executed by one or more processors of the machine 900 (e.g., processor 902), cause the machine 900 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 922 is non-transitory in that it does not embody a propagating or transitory signal. However, labeling the machine-readable medium 922 as "non-transitory" should not be construed to mean that the medium is incapable of movement; the medium should be considered as being transportable from one physical location to another in some example embodiments. Additionally, since the machine-readable medium 922 is tangible, the medium may be considered a machine-readable device.

The instructions 924 may further be transmitted or received over a communications network 926 using a transmission medium via the network interface device 920 and utilizing any one of a number of well-known transfer protocols (e.g., Hypertext Transfer Protocol (HTTP)). Examples of communication networks 926 include a local area network (LAN), a wide area network (WAN), the Internet, mobile telephone networks, plain old telephone service (POTS) networks, and wireless data networks (e.g., Wi-Fi®, LTER, and WiMAX™ networks). The term "transmission medium" shall be taken to include any intangible medium that is capable of storing, encoding, or carrying instructions 924 for execution by the machine 900, and includes digital or analog communications signals or other intangible medium to facilitate communication of such software.

In an example embodiment, a computerized method comprises receiving, at a media content device via a network, media content alert information describing at least one of a plurality of media content streams receivable at the media content device via the network from one or more media content source systems; processing, by the media content device, using at least one or more hardware processors of the media content device, the received media content alert information to generate a content news feed comprising one or more content news items; causing, by the media content device using the display device, presentation of the content news feed; receiving, at the media content device, a selection of a content news item of the one or more content news items of the content news feed, the selected content news item identifying a corresponding media content stream of the plurality of media content streams; and processing, by the media content device, based on the selected content news item, the corresponding media content stream.

In another example embodiment, including all previous example embodiments, the processing of the corresponding media content stream comprises receiving, at the media content device via the network, the corresponding media content stream; and causing, by the media content device, using the display device, presentation of the corresponding media content stream.

In another example embodiment, including all previous example embodiments, the method further comprises causing, by the media content device using the display device, during the presentation of the content news feed, presentation of a media content item; and causing, by the media content device, the presentation of the media content item to cease in conjunction with the causing of the presentation of the corresponding media content stream.

In another example embodiment, including all previous example embodiments, the media content item comprises one of the plurality of media content streams, and the method further comprises receiving, at the media content device via the network, the media content item.

In another example embodiment, including all previous example embodiments, the processing of the corresponding media content stream comprises receiving, at the media content device via the network, the corresponding media content stream; and causing, by the media content device, recording of the corresponding media content stream.

In another example embodiment, including all previous example embodiments, the one or more media content source systems comprise a broadcast content provider system, and the plurality of video content streams comprise a plurality of video content broadcast channels.

In another example embodiment, including all previous example embodiments, the one or more media content source systems comprise an online video content provider system, and the plurality of video content streams comprise a plurality of live video content streams.

In another example embodiment, including all previous example embodiments, the media content alert information comprises at least one rich site summary (RSS) feed being received via the network.

In another example embodiment, including all previous example embodiments, each of the at least one RSS feed includes media content alert information corresponding to a particular one or more of the plurality of media content streams.

In another example embodiment, including all previous example embodiments, the method further comprises subscribing, using the media content device, to the at least one RSS feed based on content preference information stored at the media content device.

In another example embodiment, including all previous example embodiments, the media content alert information is received via the network from at least one online news service.

In another example embodiment, including all previous example embodiments, the media content alert information is received via the network from at least one online social networking service.

In another example embodiment, including all previous example embodiments, the method further comprises selecting, by the media content device, the media content alert information being received based on preference information stored at the media content device, the preference information comprising an identity of at least one of the plurality of media content streams.

In another example embodiment, including all previous example embodiments, the processing of the media content alert information comprises filtering the received media content alert information based on preference information stored at the media content device.

In another example embodiment, including all previous example embodiments, the preference information comprises an identity of at least one of the plurality of media content streams.

In another example embodiment, including all previous example embodiments, the preference information comprises an identity of a sports team.

In another example embodiment, including all previous example embodiments, the preference information comprises an identity of a person.

In another example embodiment, including all previous example embodiments, the preference information comprises an identity of at least one of a media content program and a media content genre.

In another example embodiment, including all previous example embodiments, the causing of the presentation of the content news feed is based on preference information comprising at least one of a location on the display device at which the content news feed is to be displayed, and a format in which the content news feed is to be presented.

In an example embodiment, a media content device comprises one or more hardware processors; and a memory having stored therein instructions that, when executed by at least one of the one or more hardware processors, cause the media content device to perform operations comprising receiving, via a network, media content alert information describing at least one of a plurality of media content streams receivable at the media content device via the network from one or more media content source systems; processing the received media content alert information to generate a content news feed comprising one or more content news items; causing, using the display device, presentation of the content news feed; receiving a selection of a content news item of the one or more content news items of the content news feed, the selected content news item identifying a corresponding media content stream of the plurality of media content streams; and processing, based on the selected content news item, the corresponding media content stream.

In another example embodiment, including all previous example embodiments, the media content device comprises the display device.

In an example embodiment, a non-transitory computer-readable storage medium comprises instructions that, when executed by one or more hardware processors of a machine, cause the machine to perform operations comprising receiving, via a network, media content alert information describing at least one of a plurality of media content streams receivable at the media content device via the network from one or more media content source systems; processing the received media content alert information to generate a content news feed comprising one or more content news items; causing, using the display device, presentation of the content news feed; receiving a selection of a content news item of the one or more content news items of the content news feed, the selected content news item identifying a corresponding media content stream of the plurality of media content streams; and processing, based on the selected content news item, the corresponding media content stream.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain example embodiments are described herein as including logic or a number of components, modules, or mechanisms. Modules may constitute either software modules (e.g., code embodied on a machine-readable medium 922 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 902 or a group of processors 902) may be configured by software (e.g., an application or application portion) as a hardware module that operates to perform certain operations as described herein.

In some example embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, at a Content Access Device, a first push communication from a first Media Content Source System, the first push communication comprising first media content alert information;
   receiving, at the Content Access Device, a second push communication from a second Media Content Source System, the second push communication comprising second media content alert information;
   based on the first media content alert information and the second media content alert information, generating, by the Content Access Device, a news feed item corresponding to media content alert information with a higher relative priority between the first media content alert information and the second media content alert information; and
   presenting, on a display device of the Content Access Device, the news feed item in a content stream overlay, partially obscuring first video content.

2. The method of claim 1, wherein the receiving of the first push communication from the first Media Content Source System comprises receiving the first push communication from a social network platform.

3. The method of claim 1, wherein the generating of the news feed item is further based on a user preference for a favorite media content stream.

4. The method of claim 1, wherein the generating of the news feed item is further based on a user preference for a favorite subject matter.

5. The method of claim 1, wherein the generating of the news feed item is further based on a user preference for a favorite person.

6. The method of claim 1, wherein the generating of the news feed item is further based on a user preference for a favorite sport.

7. The method of claim 1, wherein the generating of the news feed item is further based on a user preference for a favorite musical genre.

8. The method of claim 1, wherein the presenting of the news feed item comprises reducing a visual size of the first video content.

9. The method of claim 1, wherein the content stream overlay comprises a plurality of news feed items, each of the plurality of news feed items indicating a particular media content stream.

10. The method of claim 1, wherein the news feed alert indicates an amount of time remaining in a sporting event.

11. The method of claim 1, wherein the news feed alert indicates a score in a sporting event.

12. The method of claim 1, wherein the news feed alert indicates an amount of time remaining before an event begins.

13. The method of claim 1, wherein the news feed alert indicates a uniform resource locator (URL).

14. A Content Access Device comprising:

a display device;

a memory that stores instructions; and one or more processors configured by the instructions to perform operations comprising:

receiving a first push communication from a first Media Content Source System, the first push communication comprising first media content alert information;

receiving a second push communication from a second Media Content Source System, the second push communication comprising second media content alert information;

based on the first media content alert information and the second media content alert information, generating a news feed item corresponding to media content alert information with a higher relative priority between the first media content alert information and the second media content alert information; and presenting, on the display device, the news feed item in a content stream overlay, partially obscuring first video content.

15. The Content Access Device of claim 14, wherein the receiving of the first push communication from the first Media Content Source System comprises receiving the first push communication from a social network platform.

16. The Content Access Device of claim 14, wherein the generating of the news feed item is further based on a user preference for a favorite media content stream.

17. The Content Access Device of claim 14, wherein the generating of the news feed item is further based on a user preference for a favorite subject matter.

18. A non-transitory machine-readable medium that stores instructions that, when executed by one or more processors of a Content Access Device, cause the one or more processors to perform operations comprising:

receiving a first push communication from a first Media Content Source System, the first push communication comprising first media content alert information;

receiving a second push communication from a second Media Content Source System, the second push communication comprising second media content alert information;

based on the first media content alert information and the second media content alert information, generating a news feed item corresponding to media content alert information with a higher relative priority between the first media content alert information and the second media content alert information; and presenting, on a display device, the news feed item in a content stream overlay, partially obscuring first video content.

19. The non-transitory machine-readable medium of claim 18, wherein the generating of the news feed item is further based on a user preference for a favorite person.

20. The non-transitory machine-readable medium of claim 18, wherein the generating of the news feed item is further based on a user preference for a favorite sport.

* * * * *